United States Patent
Satoh et al.

[11] Patent Number: 5,205,507
[45] Date of Patent: Apr. 27, 1993

[54] HUB FOR TAPE CASSETTE

[75] Inventors: Takateru Satoh, Saku; Haruo Shiba, Komoro; Masaru Ikebe, Saku; Hiroki Suzuki, Saku; Yukio Miyazaki, Saku, all of Japan

[73] Assignee: TDK Corporation, Tokyo, Japan

[21] Appl. No.: 754,769

[22] Filed: Sep. 4, 1991

Related U.S. Application Data

[63] Continuation of Ser. No. 493,193, Mar. 14, 1990, abandoned.

[30] Foreign Application Priority Data

Mar. 15, 1989 [JP] Japan .................. 1-60697

[51] Int. Cl.$^5$ .............................................. B65H 75/28
[52] U.S. Cl. ............................................................ 242/74.1
[58] Field of Search ............... 242/74.1, 74, 68.5, 242/71.8; 264/81, 83; 428/35.8, 36.91

[56] References Cited

U.S. PATENT DOCUMENTS

| | | | |
|---|---|---|---|
| 1,962,959 | 6/1934 | Kinloch | 242/74.1 |
| 3,620,469 | 11/1971 | Riedel et al. | 242/74 |
| 3,658,954 | 4/1972 | Broadbent | 264/81 |
| 3,900,540 | 8/1975 | Rebba et al. | 264/81 X |
| 4,101,699 | 7/1978 | Stine et al. | 428/36 |
| 4,259,278 | 3/1981 | Flegel et al. | 264/81 |
| 4,290,562 | 9/1981 | Sasaki et al. | 242/74 |
| 4,300,729 | 11/1981 | Oishi et al. | 242/74.1 |
| 4,321,087 | 3/1982 | Levine et al. | 264/81 |
| 4,511,099 | 4/1985 | Nunokawa et al. | 242/71.8 |
| 4,664,328 | 5/1987 | Yamada | 242/71.8 |
| 4,750,683 | 6/1988 | Schoettle et al. | 242/74.1 |
| 4,786,007 | 11/1988 | Schoettle | 242/74 |
| 4,927,578 | 5/1990 | Naarman et al. | 26/481 |
| 4,935,833 | 6/1990 | Shiba et al. | 360/432 |
| 4,950,512 | 8/1990 | Akao | 428/35.8 |
| 4,971,846 | 11/1990 | Lundy | 428/35.8 |

FOREIGN PATENT DOCUMENTS 59-58674 4/1984 Japan .

Primary Examiner—Daniel P. Stodola
Assistant Examiner—John P. Darling
Attorney, Agent, or Firm—Wood, Phillips, VanSanten, Hoffman & Ertel

[57] ABSTRACT

A for winding a tape thereabout for a tape cassette about which a tape can be wound. The hub has a hub body and a tape clamp that fits in a recess defined by the periphery of the hub body. The hub body has a coefficient of linear expansion below $6 \times 10^{-5}$ cm/cm °C. at $-10°$ to $+90°$ C. The periphery of the hub body can be plated with a metal film.

6 Claims, 2 Drawing Sheets

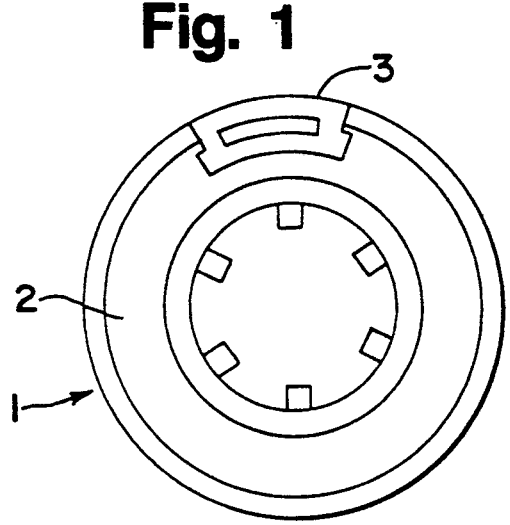
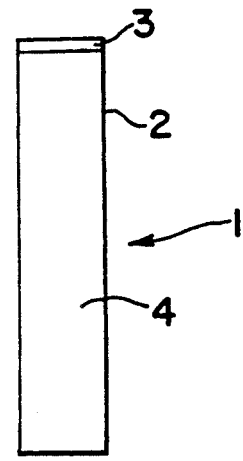
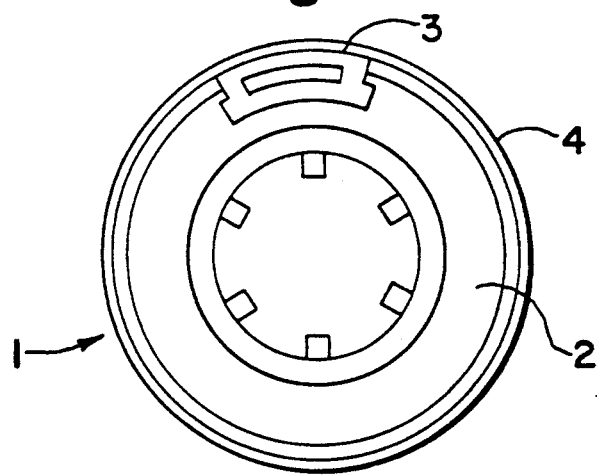

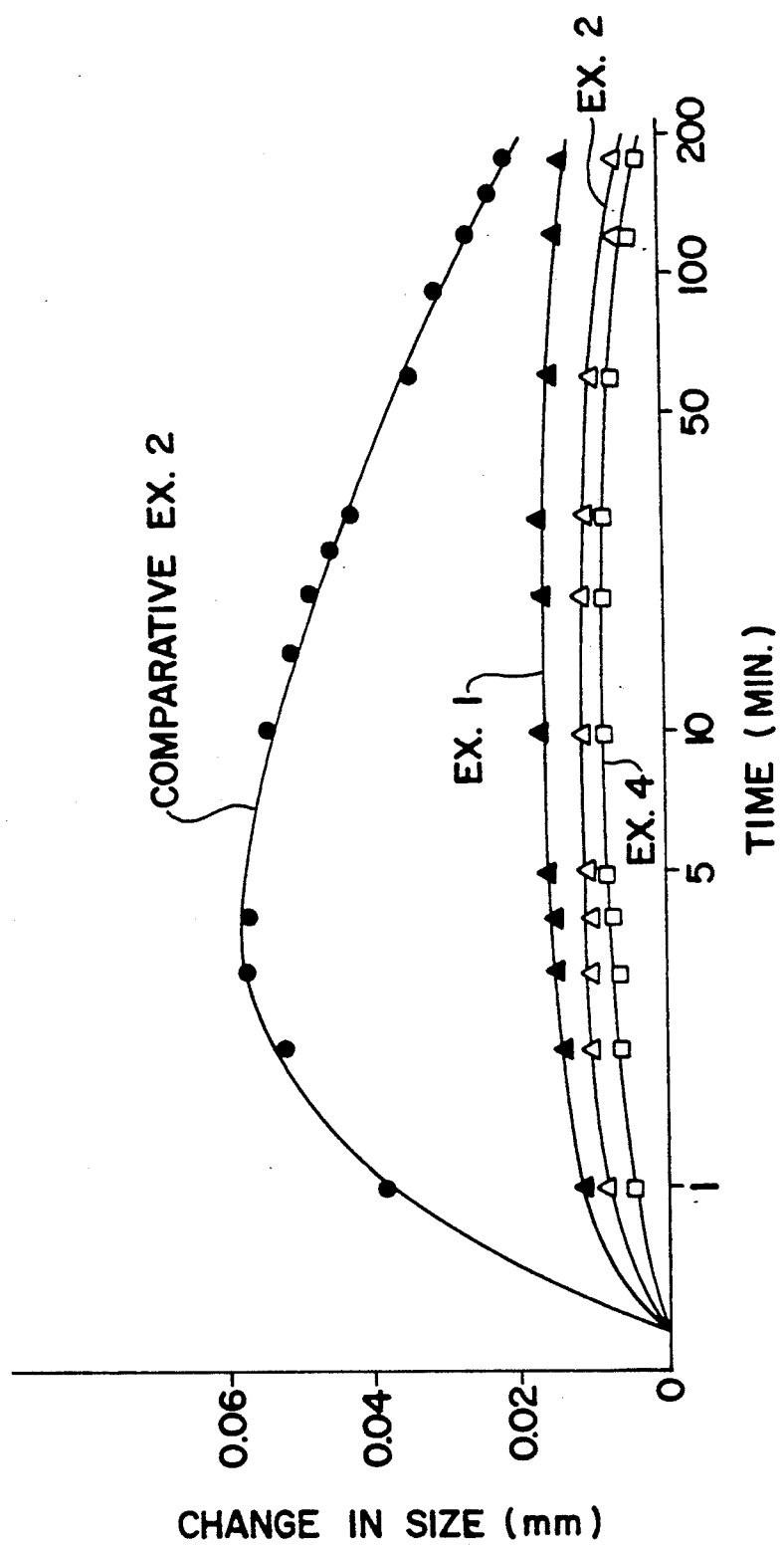

HUB FOR TAPE CASSETTE

CROSS REFERENCE TO RELATED APPLICATION

This is a continuation of now abandoned U.S. Ser. No. 07/493,193, filed on Mar. 14, 1990.

TECHNICAL FIELD

The present invention relates to a hub for a tape cassette.

PROBLEMS OF CONVENTIONAL TECHNIQUE

A tape cassette such as a video tape cassette, an audio tape cassette, etc. has a pair of tape winding hubs to wind a tape thereon. This kind of hub is generally made of polyacetal (P.O.M.) or polycarbonate, etc. and comprises a hub body having a recess formed in a part of the periphery of the hub, and a tape clamp snapped in the recess. The present invention is applied to the hub body, and in some cases to the clamp, too.

One end of a magnetic tape is fixed by fitting a clamp in the recess formed on the hub. In this case, a step or difference in height is often formed between the clamp and the hub, and there is a possibility of this step being transferred, after long hours of non-use, to the magnetic tape to form creases, which cause an increase in error rate. If the creases are large, a gap will be created between the tape and the head which, due to the spacing loss, causes a reduction of output, causes read out error, etc. Even if an error occurs, previously registered data can be restored to some degree by interpolation if the error rate is low, while, if there are too many errors, a muting condition, i.e., a state of no sound, will result.

Demands for performances of a tape cassette are becoming more and more severe. For example, regarding recording/reproduction, a Digital Audio Tape (DAT) cassette for audio or information is now on the market. However, it is necessary to prevent as much as possible wrong recording or read out error rate (so-called "the error rate") of digital information to improve fidelity. Even in other analog recording systems, it is necessary to improve not only performance of a digital tape but also mechanical performance of a cassette by slowing down the speed of the tape. Referring to a DAT tape, the present situation is that the error rate of the portion of a digital tape wound near the hub is worse as compared with the other portions. More particularly, a digital tape stored for a long period of time or stored at high temperatures has this tendency, and errors in interpolation are not allowed for information use, although it is allowed for music use. The target is to limit the error rate to the order of $10^{-2}$ (one piece among 100 pieces of error rate according to the high temperature storage test to be defined hereafter), and further reduction is desired.

To solve this problem improvements in design have been made, including reduction of the difference in height and gap between the hub body and the clamp, or restriction of a sink mark (caused by local thermal contraction at the time of injection molding) but, nevertheless, a satisfactory solution has not been offered yet.

OBJECT OF THE INVENTION

Accordingly, the object of the present invention is to provide a hub to be used for a tape cassette with high stability of dimensions.

SUMMARY OF THE INVENTION

According to the present invention, a hub for a tape cassette including a hub body and a tape clamp is characterized in that the hub body has a coefficient of linear expansion below $6 \times 10^{-5}$ cm/cm °C. at the ambient temperature of minus 10°–90° C., and that preferably, the material is selected from a group consisting of all aromatic polyester, all aromatic polyester containing inorganic fillers and polyacetal containing inorganic fillers. These materials improve the stability of the dimensions and improve the characteristics of a cassette tape.

Moreover, the present invention offers a hub for a tape cassette characterized in that the hub body is made of plastic material and a metal film is formed by plating on its peripheral surface.

As the material for a hub body of the present invention is selected from a group consisting of all aromatic polyester, all aromatic polyester containing inorganic fillers and polyacetal containing inorganic fillers, the rate of molding contraction at the time of plastic molding is very low and therefore the accuracy of dimension of the hub's peripheral surface is very high. Both in this case and the case where the hub consists of a hub body made of plastic material and a metal-plating film formed on its peripheral surface, high temperature stability of finished articles is enhanced, the dimensions are little changed after long periods of storage at high temperatures and, accordingly, the characteristics of registration/reproduction of the tape cassette using this hub are improved. When, for example, the hub is used for a DAT cassette, the error rate decreases sharply. When the present invention is applied to other types of cassette, suitable effect due to stability can be attained.

DETAILED EXPLANATION OF THE INVENTION

In the course of efforts to reform a conventional hub, the present inventors found that the aforementioned problems of a conventional hub, namely, the causes which increase the error rate, depend greatly upon the accuracy of dimensions at the time of plastic molding and the aging after that. At the time of molding, a conventional hub has a comparatively large coefficient of linear expansion, which is, for example $10 \times 10^{-5}$ to $12 \times 10^{-5}$ cm/cm °C. with polyacetal and $8 \times 10^{31~5}$ cm/cm °C. with polycarbonate. This causes deformation of the peripheral surface of molded articles due to which a sink mark or the like caused by local variations of thickness damages the true cylindricity of the peripheral surface. Also, after molding, dimensions of the hub tend to be changed by aging under the effect of temperature, etc. which causes a local change of diameter of the hub and deviation from true cylindricity of the peripheral surface.

In accordance with the present invention, it has been found that conventional problems can be solved by a hub comprising a hub body and a tape clamp snapped in a recess of the hub body, characterized in that the hub body (and in some cases the tape clamp as well) is formed from a material selected from a group consisting of all aromatic polyester, all aromatic polyester containing inorganic fillers and polyacetal containing inorganic fillers. The all aromatic polyester resin is known as a liquid crystal polymer which is comprised of a rigid high polymer (for example, the all aromatic polyester resin is sold under trade name VECTRA by Cellanese Corp. of U.S.A.) and its molecule chain cannot be easily bent even in the state of solution. This resin could be used alone as a clamp in the present invention. More preferably, inorganic fillers, for example, carbon fibers, are mixed to the resin to further improve the stability of dimensions. The coefficient of linear expansion of such liquid crystal polymer is below $6 \times 10^{-5}$ cm/cm°C. under minus 10°–90° C., and when mineral fibers, powder or carbon fibers are mixed therein, the stability of dimensions are improved and the dimensions are little changed by temperature variation. It has also been found that the coefficient of linear expansion of polyacetal mixed with mineral powder or fibers, or carbon fibers can easily fall below $6 \times 10^{-5}$ cm/cm °C. at the ambient temperatures of minus 10°–90° C. Consequently, a hub with little contraction and, accordingly, a hub body with a peripheral surface having true cylindricity can be obtained. Furthermore, it has been found that the superior temperature stability thereof leads to a low error rate which is little changed from that of the beginning for a long period of time.

Inorganic fillers which may be used in the present invention include potassium titanate, zinc oxide, titanium oxide, mineral powder and/or carbon fibers. Use of 5–30 wt % of them incorporated into the resin further improves the stability of the dimensions.

During the similar trials, the present inventors came to think that such deformation of peripheral surface could be restrained by physically restricting the thermal expansion of the hub, and experiments have confirmed that the anticipated results are attained. Accordingly, another aspect of the present invention provides a hub that consists of a hub body and a plated metal film formed on its peripheral surface. In this case, a plastic material to be used for hub body may be any plastic material conventionally used for this kind of hub, for example, acrylonitrile batadiene styrene (ABS)-polystyrene copolymer, polyacetal (POM), polycarbonate, polypropylene, polyethylene, PBT (polybutylene terephthalate), polystyrol, and the like. Preferably, if it consists of a plastic material with a low coefficient of thermal expansion and with small change by aging, such as the all aromatic polyester, for example, the liquid crystal polymer, referred to above, better results are obtained.

Any conventional metal for plating may be used. For example, a film of metal plated on the peripheral surface may be formed according to such a process as non-electrolytic plating followed by subsequent electroplating on the surface of a plastic. Possible examples are to plate an underlayer of nickel and then a top layer of chromium, an underlayer of copper and a top layer of nickel or an underlayer of copper and a top layer of chromium, or to plate with these metals alone, etc.

The invention will now be described in detail in the following in connection with preferred embodiments of the invention.

BRIEF EXPLANATION OF DRAWINGS

FIG. 1 shows a front view of a hub of a preferred embodiment of the present invention;

FIG. 2 shows the side view of the hub in FIG. 1;

FIG. 3 shows a front view of a hub of another preferred embodiment of the present invention; and FIG. 4 shows a graph showing the change in size or dimension by aging of the preferred examples and comparative examples.

DESCRIPTION OF THE PREFERRED EMBODIMENTS

The embodiments will now be explained by making reference to an example of Digital Audio Tape (DAT) cassette. FIGS. 1 and 2 illustrate a tape winding hub 1 according to the present invention, wherein the hub 1 consists of a hub body 2 and a tape clamp 3 which is snapped in a recess of the hub body. A structure of this kind is conventional. According to one aspect of the present invention, hub body 2 (or together with clamp 3) of this construction is made of the above-mentioned liquid crystal polymer. In another aspect of the present invention, at least hub body 2 is made of plastic material selected from the aforementioned various kinds of plastic materials, and further on its peripheral surface (or together with the peripheral surface of clamp 3) is formed a film 4 of plated metal as illustrated in FIG. 3. The present invention will, hereafter, be further explained in detail referring to comparative examples and preferred examples.

EXAMPLES 1, 2, 3 AND COMPARATIVE EXAMPLES 1, 2, 3

The hub body of the structure in FIGS. 1-2 was made by molding of various kinds of plastic materials. As an example, VECTRA (trade name of an all aromatic polyester produced by Cellanese of U.S.A.) was used as a liquid crystal polymer to mold hubs. The hub body without containing any fillers is Example 1, the one with 10 wt % of added mineral powder is Example 2, and the one with 10 wt % of added carbon fibers is Example 3. The one using ABS-polystyrene copolymer is shown as Comparative Example 1, the one using polyacetal (POM) shown as Comparative Example 2, and the one using polycarbonate shown as Comparative Example 3.

Coefficient of Molding Contraction

The result of the measured coefficient of molding shrinkage or contraction of the aforementioned hubs is listed in Table 1.

Further, the coefficient of molding contraction was obtained from the measured shrinkage of diameter (at 90 degrees from the recess for a clamp) of the hub body based on metal mold dimensions. That is, the coefficient is determined by the following formula:

$$\frac{\text{dimension of the mold} - \text{dimension of the molded product}}{\text{dimension of the mold}} \times 100 = \text{coefficient of molding contraction (\%)}$$

As is seen from Table 1, POM, etc. have comparatively high coefficients of contraction. In contrast, the coefficient of molding contraction of the hub body made of a liquid crystal polymer is about 0.05%, which is comparatively low. Further improvement is achieved when fillers are used.

Stability

Further, error rates of the samples and a few articles on the market (i.e., SAMPLES A to D of Table 2) were measured. Using equipment for a DAT cassette, recording/reproduction error rates were first measured for 6 minutes from the start of winding of a magnetic tape which was then reeled in the play mode and stored for 3 hours in a space at a constant temperature of 80° C.

and 0% RH and thereafter the error rates were measured again. The result is shown in Table 2. Table 2 indicates the number of samples with which errors occurred against total number of test samples. The error rate is defined as the number of data which were not reproduced divided by the total number of recorded data. It is normally required that the error rate after storage be below $10^{-2}$.

As seen from Table 2, the error rate is lower with liquid crystal polymer and higher with POM.

The result of change in hub dimensions at the same conditions of 80° C., 0% RH is shown in FIG. 4 together with other examples described below.

EXAMPLE 4

Next, an underlayer of non-magnetic nickel-phosphor was formed on the periphery of the hub bodies of the various kinds of hubs of Table 1 by non-electrolytic plating followed by electrolytic plating with chromium. The result of change in dimension by aging of the various kinds of the hubs under the same conditions as mentioned above is shown in FIG. 4. It is clearly shown that the stability of the dimensions by aging is greatly improved in accordance with the present invention.

Further, the error rate of a hub with this plated film of metal was measured. The result is shown in Table 2.

EXAMPLES 5-10

When tests were conducted on the clamps using the materials of Examples 1-3, the liquid crystal polymer had a high coefficient of bending elasticity and was easily deformed due to creep. Therefore, when the clamp was snapped in the hub and used, the end of the tape could not be fixed firmly in position due to the plastic deformation of the clamp (Comparative Examples 4-6). To overcome this inconvenience the molding was examined. However, it was not easy to redesign it because the material had a high coefficient of bending elasticity and easy plastic deformation. That is why a molding test of a hub was made using materials with low coefficient of linear expansion and low plastic deformation. Namely, the clamp and hub were molded from various kinds of materials shown in Table 3 (Examples 5-10). The characteristics thereof are shown in Table 3.

Similar experiments of a combination of the hub of Examples 1-4 and polyacetal are also shown.

Table 4 shows the result of measurement of the error rate and muting of the clamp and hub of Examples 5-10. In Comparative Example 7, polyacetal (POM) was used for the hub and clamp, and in Comparative Example 8, polycarbonate was used for both.

Muting is a lack of sound because of the fact that portion of the data was cut automatically by a DAT deck to suppress noise, because this portion corresponds to the area where error rate is large and would have become a noise when reproduced after Digital/Analog (D/A) conversion if it was not cut.

TABLE 1

| | Name of Material | Coefficient of Molding Contraction (%) |
|---|---|---|
| Example 1 | Liquid crystal polymer | 0.5–0.10 |
| Example 2 | Liquid crystal polymer + mineral powder or liquid crystal polymer + titanium oxide or liquid crystal polymer + zinc oxide | 0.4–0.08 |
| Example 3 | Liquid crystal polymer + carbon fibers | 0.04–0.08 |
| Comparative Example 1 | ABS - polystyrene copolymer | 0.40–0.60 |
| Comparative Example 2 | Polyacetal (POM) | 2.00–2.30 |
| Comparative Example 3 | Polycarbonate | 0.50–0.80 |

TABLE 2

| Change of Error Rate After High Temperature Storage | | | | | | |
|---|---|---|---|---|---|---|
| Conditions | $10^{-1}$ Bad, Good $10^{-4}$ | | | | | |
| 80° Dry | Before Storage | | | After Storage | | |
| 3 hrs. | $10^{-2}$ | $10^{-3}$ | $10^{-4}$ | $10^{-1}$ | $10^{-2}$ | $10^{-3}$ |
| Ex. 1 | | 5/5 | | | 1/5 | 4/5 |
| Ex. 2 | | 5/5 | | | 1/5 | 4/5 |
| Ex. 3 | | 5/5 | | | 1/5 | 4/5 |
| Com. Ex. 1 | | 5/5 | | 3/5 | 2/5 | |
| Com. Ex. 2 | | 4/5 | 1/5 | 4/5 | 1/5 | |
| Com. Ex. 3 | | 5/5 | | 3/5 | 2/5 | |
| Sample A | 1/15 | 12/15 | 3/15 | 13/15 | 1/15 | 1/15 |
| Sample B | | 5/13 | 8/13 | 6/13 | 7/13 | |
| Sample C | | 2/6 | 4/6 | 1/6 | 2/6 | 3/6 |
| Sample D | | 4/6 | 2/6 | 5/6 | 1/6 | |
| Ex. 4 | | 5/5 | | | 2/5 | 3/5 |
| Com. Ex. 1 + plating | | | | | | |

TABLE 3

| | Material Of Hub | Coefficient of Linear Expansion | Coefficient of Bending Elasticity |
|---|---|---|---|
| Ex. 1 | Liquid crystal polymer | $3.6 \times 10^{-5}$ | 90000 kg/cm$^2$ |
| Ex. 2 | Ex. 1 + mineral powder | $2.8 \times 10^{-5}$ | 140000 kg/cm$^2$ |
| Ex. 3 | Ex. 1 + carbon fiber | $0.8 \times 10^{-5}$ | 260000 kg/cm$^2$ |
| Ex. 4 | Plating | — | — |
| Ex. 5 | Ex. 1 + mineral powder | $2.8 \times 10^{-5}$ | 140000 kg/cm$^2$ |
| Ex. 6 | Ex. 1 + carbon fiber | $0.8 \times 10^{-5}$ | 260000 kg/cm$^2$ |
| Ex. 7 | Ex. 1 + mineral powder | $2.8 \times 10^{-5}$ | 140000 kg/cm$^2$ |
| Ex. 8 | Ex. 1 + carbon fiber | $0.8 \times 10^{-5}$ | 260000 kg/cm$^2$ |
| Ex. 9 | POM + potassium titanate | $3.6 \times 10^{-5}$ | 68000 kg/cm$^2$ |
| Ex. 10 | POM + carbon fiber | $4.0 \times 10^{-5}$ | 57000 kg/cm$^2$ |
| C. Ex. 4 | Liquid crystal polymer | $3.6 \times 10^{-5}$ | 90000 kg/cm$^2$ |
| C. Ex. 5 | Ex. 1 + mineral powder | $2.8 \times 10^{-5}$ | 140000 kg/cm$^2$ |
| C. Ex. 6 | Ex. 1 + carbon fiber | $0.8 \times 10^{-5}$ | 260000 kg/cm$^2$ |
| | Material Of Clamp | Coefficient of Bending Elasticity | Deformation Molded Clamp |
| Ex. 1 | POM | 90000 kg/cm$^2$ | No |
| Ex. 2 | POM | 140000 kg/cm$^2$ | No |
| Ex. 3 | POM | 260000 kg/cm$^2$ | No |
| Ex. 4 | POM | — | No |
| Ex. 5 | POM + Potassium titanate | 140000 kg/cm$^2$ | No |
| Ex. 6 | POM + Potassium titanate | 260000 kg/cm$^2$ | No |
| Ex. 7 | POM + Carbon Fiber | 140000 kg/cm$^2$ | No |

TABLE 3-continued

| Ex. 8 | POM + Carbon Fiber | 260000 kg/cm² | No |
| Ex. 9 | POM + Potassium titantate | 8000 kg/cm² | No |
| Ex. 10 | POM + Carbon Fiber | 57000 kg/cm² | No |
| C. Ex. 4 | Same as Hub | 90000 kg/cm² | x (Yes) |
| C. Ex. 5 | Same as Hub | 140000 kg/cm² | x (Yes) |
| C. Ex. 6 | Same as Hub | 260000 kg/cm² | x (Yes) |

TABLE 4

| | Coefficient of Linear Ex. | Error Rate of Beginning | Stored at 60° C. 72 hrs | | Stored at 60° C. 72 hrs | |
| --- | --- | --- | --- | --- | --- | --- |
| | | | Error Rate | Muting | Error Rate | Muting |
| Ex. 5 | $2.8 \times 10^{-5}$ | $2.0 \times 10^{-4}$ | $3.0 \times 10^{-4}$ | ◯ | $4.0 \times 10^{-4}$ | ◯ |
| Ex. 6 | $0.8 \times 10^{-5}$ | $1.5 \times 10^{-4}$ | $2.0 \times 10^{-4}$ | ◯ | $3.0 \times 10^{-4}$ | ◯ |
| Ex. 7 | $2.8 \times 10^{-5}$ | $1.5 \times 10^{-4}$ | $2.8 \times 10^{-4}$ | ◯ | $3.5 \times 10^{-4}$ | ◯ |
| Ex. 8 | $0.8 \times 10^{-5}$ | $1.8 \times 10^{-4}$ | $3.5 \times 10^{-4}$ | ◯ | $4.5 \times 10^{-4}$ | ◯ |
| Ex. 9 | $3.6 \times 10^{-5}$ | $1.6 \times 10^{-4}$ | $4.0 \times 10^{-4}$ | ◯ | $6.5 \times 10^{-4}$ | ◯ |
| Ex. 10 | $4.0 \times 10^{-5}$ | $1.5 \times 10^{-4}$ | $5.0 \times 10^{-4}$ | ◯ | $7.0 \times 10^{-4}$ | ◯ |
| C. Ex. 7 | $10\text{-}12 \times 10^{-5}$ | $2.0 \times 10^{-4}$ | $2.0 \times 10^{-2}$ | X | $4.0 \times 10^{-2}$ | ◯ |
| C. Ex. 8 | $8.0 \times 10^{-5}$ | $1.5 \times 10^{-4}$ | $1.5 \times 10^{-2}$ | X | $2.0 \times 10^{-2}$ | X |

◯ = absence of muting
X = presence of muting

Effect

From aforesaid results it was found that, when at least a hub body was composed of a material having a coefficient of linear expansion below $6 \times 10^{-5}$ cm/cm °C. at ambient temperatures of minus 10°-90° C., such as all aromatic polyester, all aromatic polyester containing inorganic fillers, or polyacetal containing inorganic fillers, error rate increased little after a long period of storage under high ambient temperatures, and its initial characteristics were maintained.

It will be evident for those skilled in the art that the present invention can be easily modified without departing from the spirit of the present invention.

What is claimed is:

1. A hub for winding a tape thereabout for a tape cassette, the hub consisting of a hub body and a tape clamp, the hub body having a periphery defining a recess therein, the tape clamp being fit in the recess of the periphery of the hub body, characterized in that the hub body and the tape clamp have a coefficient of linear expansion below $6 \times 10^{-5}$ cm/cm °C. at temperatures of minus 10°-90° C., wherein the material of the hub body and the tape clamp is an aromatic polyester containing an inorganic filler, the inorganic filler being present in an amount effective to achieve the coefficient of linear expansion below $6 \times 10^{-5}$ cm/cm °C. at temperatures of minus 10°-90° C.

2. A hub of a tape cassette of claim 1 wherein the filler is present in an amount in the range of about 5 to about 30 weight percent.

3. A hub for a tape cassette consisting of a molded hub body and a tape clamp, the hub body having a periphery that defines a recess, the tape clamp being fit in the recess of the periphery of the hub body, characterized in that a plastic material of at least said hub body is at least one or aromatic polyester, aromatic polyester polyacetal, ABS-polystyrene copolymer and polycarbonate, the plastic material contains an inorganic filler, and a plated metal film is on the surface of the periphery, wherein the inorganic filler is selected, and is present in an amount effective, to achieve a coefficient of linear expansion below $6 \times 10^{-5}$ cm/cm °C. at temperatures of minus 10°-90° C.

4. A hub for a magnetic tape cassette of claim 3 wherein the inorganic filler is present in an amount in the range of about 5 to about 30 weight percent.

5. A hub for a tape cassette consisting of a molded hub body and a tape clamp, the hub body having a periphery that defines a recess, the tape clamp being fit in the recess of the periphery of the hub body, characterized in that a plastic material of at least said hub body is at least one of aromatic polyester, aromatic polyester polyacetal, ABS-polystyrene copolymer, and polycarbonate, the plastic material contains an inorganic filler, and a plated metal film is on the surface of the periphery, wherein the material of the plated metal film is selected from a group consist of nickel, chrome and aluminum and wherein the inorganic filler is selected, and is present in an amount effective, to achieve a coefficient of linear expansion below $6 \times 10^{-5}$ cm/cm °C. at temperatures of minus 10°-90° C.

6. A hub for a magnetic tape cassette of claim 5 wherein the filler is present in an amount in the range of about 5 to about 30 weight percent.

* * * * *